United States Patent [19]
Cormier

[11] Patent Number: 5,339,566
[45] Date of Patent: Aug. 23, 1994

[54] SEEDLING CONTAINER

[75] Inventor: Mario R. Cormier, Surrey, Canada

[73] Assignee: First Choice Manufacturing Ltd., Surrey, Canada

[21] Appl. No.: 997,105

[22] Filed: Dec. 24, 1992

Related U.S. Application Data

[63] Continuation of Ser. No. 539,136, Jun. 18, 1990, abandoned.

[30] Foreign Application Priority Data

May 31, 1990 [CA] Canada ............................ 2017945

[51] Int. Cl.⁵ .................................................. A01G 9/02
[52] U.S. Cl. ............................................. 47/87; 47/79
[58] Field of Search .................. 47/79, 87, 77, 73, 66

[56] References Cited

U.S. PATENT DOCUMENTS

| | | | |
|---|---|---|---|
| 1,317,569 | 9/1919 | Forster | 47/79 |
| 3,339,310 | 9/1967 | Solomon | 47/66 |
| 3,931,644 | 1/1976 | Krikorian | 47/87 |
| 3,949,524 | 4/1976 | Mickelson | 47/79 |
| 3,961,444 | 6/1976 | Skaife | 47/79 |
| 4,173,097 | 11/1979 | Staby | 47/79 |
| 4,183,175 | 1/1980 | Magee | 47/79 |
| 4,442,628 | 4/1984 | Whitcomb | 47/66 |
| 4,753,037 | 6/1988 | Whitcomb | 47/87 |
| 4,878,313 | 11/1989 | Polesel | 47/87 |
| 4,916,857 | 4/1990 | Kinghorn | 47/73 |

Primary Examiner—Ramon S. Britts
Assistant Examiner—Joanne C. Downs
Attorney, Agent, or Firm—Elbie R. de Kock

[57] ABSTRACT

A seedling container comprises a body member which is provided with a plurality of longitudinal cavities for seedlings. Each cavity is provided with a plurality of circumferentially extending barriers spaced along the length of the cavity. Each barrier preferably comprises a V-shaped recess in the cavity surface to trap the tip of a root therein.

11 Claims, 4 Drawing Sheets

SEEDLING CONTAINER

This application is a continuation of U.S. patent application Ser. No. 07/539,136, filed Jun. 18, 1990, now abandoned, the contents of the aforementioned application being incorporated herein by reference.

This invention relates to a seedling container of the type used for raising seedlings from seed to a stage where the seedlings are ready for transplanting, such as, for example, trees which are to be transplanted in forests.

BACKGROUND OF THE INVENTION

Seedling containers are available which comprise a styrofoam block provided with a plurality of cone-shaped cavities therein for the tree seedlings.

In use, seeds, together with a growing material, such as a compost mixture, is introduced into the cavities. When the seeds germinate and the seedlings grow, a root structure is developed in the growing material which is easily extracted from the cavity due to the conical form of the cavity. The growing material and root structure is in the form of a plug when removed from the cavity and the seedling is planted in the soil by making an appropriate hole with a dibble in the soil to receive the plug.

To give the seedling the best chance of surviving the transplanting operation, it is essential for the seedling to have a well-developed and healthy root structure. It should not become potbound, i.e. the roots should not be pot bound, i.e. spiral, and the roots should be branched out as much as possible so that the roots can spread out quickly in the ground once transplanted and take hold.

In order to promote branching, chemical treatment methods have been employed, such as treating the cavities in which the seedlings are grown with a copper carbonate solution. This is intended to stop root growth where contact with the copper compound is made and thus cause side roots to form. However, this method has the disadvantages that the ends of the roots are chemically burned off, thus defeating the purpose of producing a healthy natural root, and further, the seedlings treated in this way are susceptible to copper imbalances.

SUMMARY OF THE INVENTION

According to the invention, there is provided a method of facilitating root branching in a seedling which comprises the step of growing the seedling in a container having a circumferentially extending barrier on the internal surface of the container between the top and the bottom of the container. Preferably the container has a plurality of the circumferentially extending barriers spaced along the height of the container. The barrier is conveniently in the form of a pocket on the inner surface of the container which traps the end of a root growing into it and stimulates the formation of side roots. By spacing the pockets along the height of the container, a healthy and well-branched root system is developed.

Also according to the invention, there is provided a container for a seedling wherein the container is provided with a circumferentially extending barrier on the internal surface of the container between the top and the bottom thereof.

According to a further embodiment of the invention, there is provided a seedling container which comprises a body member which is provided with a plurality of longitudinal cavities for seedlings and wherein each cavity is provided with a circumferentially extending barrier on the internal surface of the cavity between the top and the bottom thereof.

The invention also extends to a mould for producing the seedling container, as described, which comprises a support member provided with a plurality of pins thereon for forming the cavities of the seedling container, wherein each pin is provided with a circumferentially extending protrusion on the surface thereof. Preferably, the pins are removably secured to the support member, such as by means of screws.

Further objects and advantages of the invention will become apparent from the description of a preferred embodiment of the invention below.

BRIEF DESCRIPTION OF THE DRAWINGS

The invention will now be described, by way of an example, with reference to the accompanying drawings, in which:

FIGS. 3A to 5A are side views of three different types of pins of a mould for producing the cavities of a seedling container according to the invention;

FIGS. 3B to 5B are longitudinal sections through the pins of FIGS. 3A to 5A;

FIGS. 3C to 5C are front end views of the pins of FIGS. 3A to 5A; and

DETAILED DESCRIPTION OF PREFERRED EMBODIMENT

Figure 1:
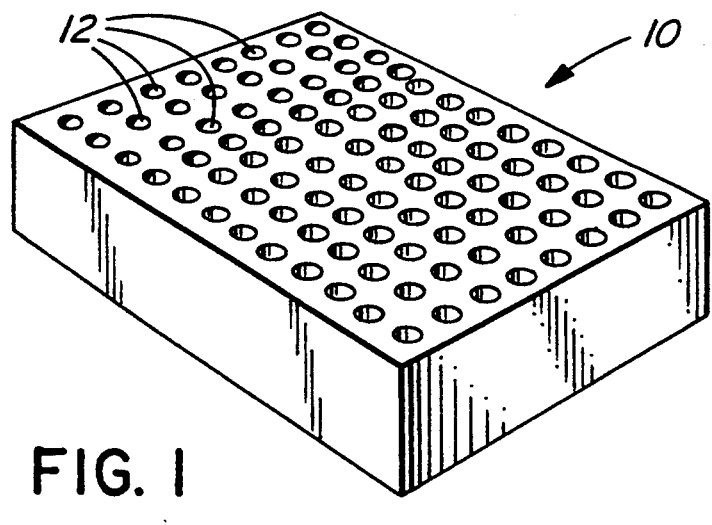
FIG. 1 is a three-dimensional view of a seedling container according to the invention.

Referring to FIG. 1, reference numeral 10 generally indicates a seedling container which is conveniently moulded from an expanded polystyrene. The container is provided with a plurality of conical cavities 12 for seedlings 14. The cavities 12 are circular in shape at their upper ends and have openings at their lower ends, not shown, for the drainage of water. The cavities 12 are further also provided with circumferentially spaced ribs (not shown in FIGS. 1 and 2) extending along their lengths which, in practice, has been found to counteract the tendency of the seedling roots to spiral and thus to produce roots which are directed towards the hole at the bottom of the cavity 12.

Each cavity 12 is further provided with a plurality of circumferentially extending barriers on the inside surface thereof which are in the form of recesses or pockets 16 extending horizontally around the inner surface of the cavity 12. A plurality of the pockets 16 are spaced along the length of the cavity 12. As can be seen from FIG. 2, the pockets 16 have a V-shaped cross section.

Figure 3A:
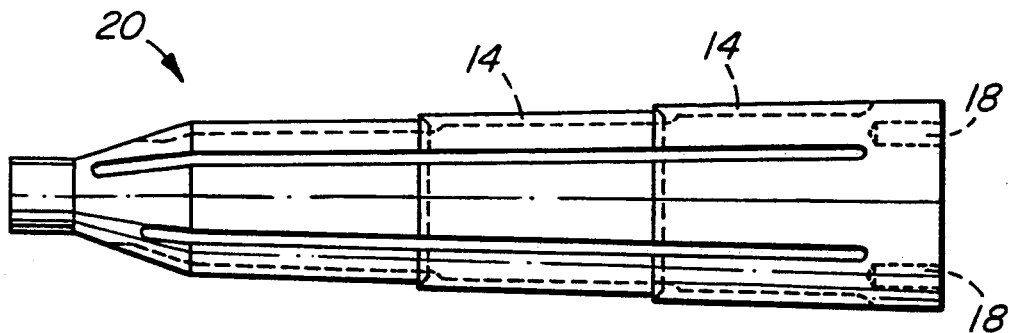
Figure 3B:
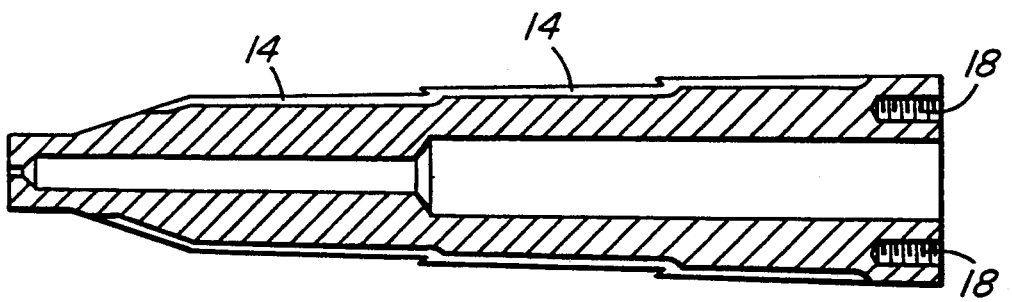
Figure 3C:
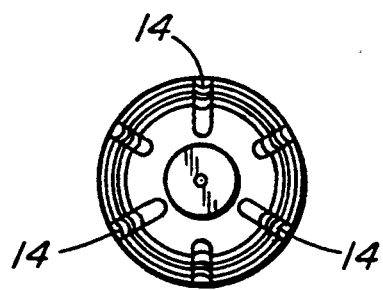
Figure 4A:
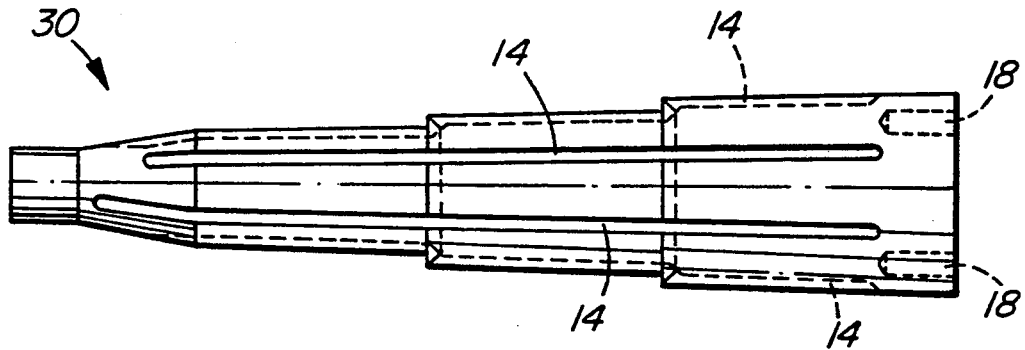
Figure 4B:
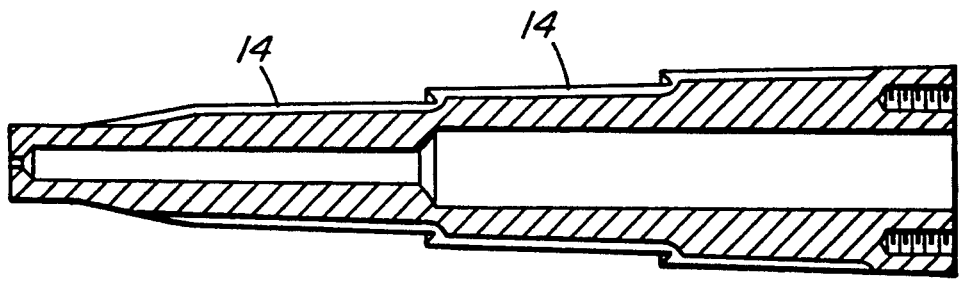
Figure 4C:
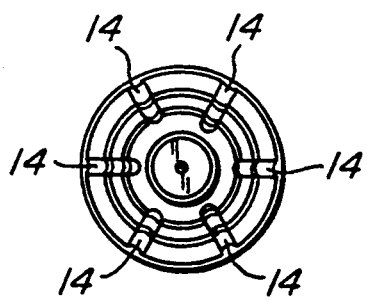
Figure 5A:
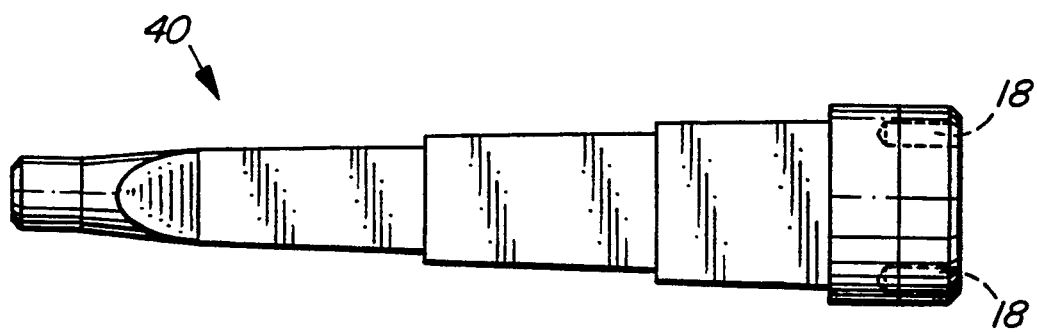
Figure 5B:
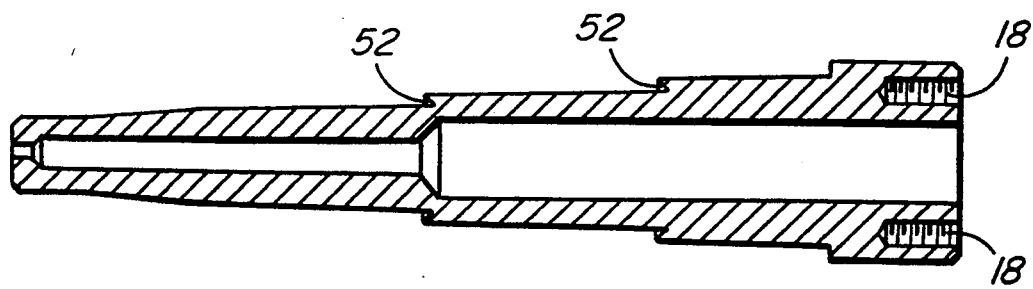
Figure 5C:
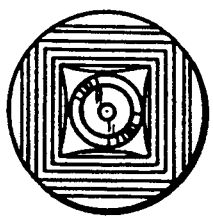

Referring now to FIGS. 3 to 5, three different pins 20, 30 and 40, respectively, are illustrated for forming three different types of cavities 12.

Each of the pins 20, 30 40 is provided with a plurality of circumferentially spaced recesses 14 for forming longitudinally extending ribs on the inside surfaces of the cavities 12. The recesses 14 are not shown in FIG. 5.

As can be seen, each pin 20, 30, 40 is provided with circumferentially extending shoulders 14 for forming the pockets 16 on the inside surfaces of the cavities 12.

Figure 6:
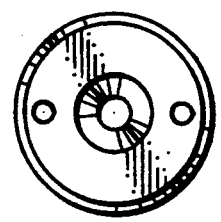
FIG. 6 shows a rear end view of a pin.

Each pin 20, 30, 40 also has a pair of screw-threaded holes 18 on its base for screwing the pin onto a support member (not shown) to form one part of a mould for forming the cavities 12. An end view of the base of a pin 20, 30, 40 showing the screw-threaded holes 18 is shown in FIG. 6.

OPERATION

Figure 2:
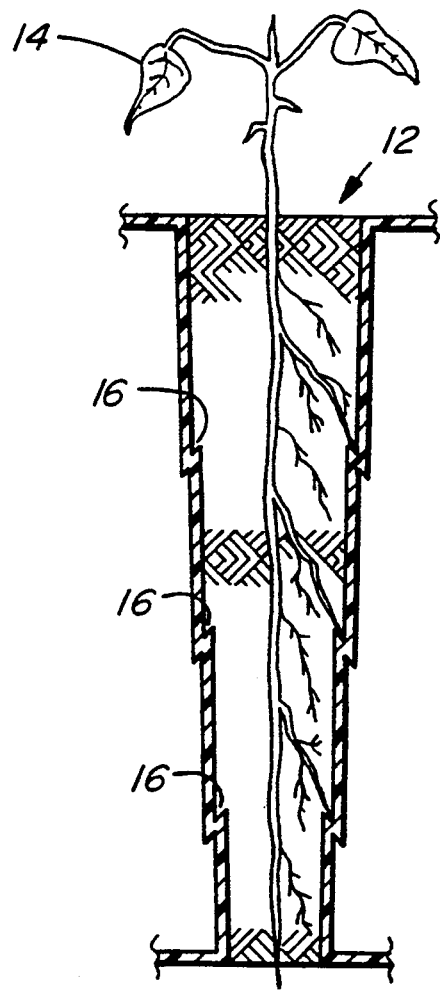
FIG. 2 is a cross section, on a larger scale, of a cavity of the seedling container of FIG. 1, and partly showing a root structure of a seedling therein.

In use of the seedling container 10, the cavities 12 are filled with a suitable growing mixture and seeds in a conventional manner. When the seedlings 14 grow and form root systems, side roots which grow into the pockets 16 are stopped from further growth and this stimulates the formation of further side roots so that a seedling with a well-branched and well-developed root system is obtained, as shown in FIG. 2. When the seedling has been transplanted, the side roots which have been trapped from further growth in the pockets 16 can resume growth in their natural way.

As can be seen from FIG. 1, all the cavities 12 have a round opening at their upper ends. This enables tree nurseries to continue using existing planting, transplanting and extracting machinery. The pins illustrated in FIGS. 3 and 4 have circular cross sections along their entire lengths, but the pin 40 illustrated in FIG. 5 has a square cross section in the vicinity of the shoulders 52 but at its upper end it has a round cross section.

The number of shoulders provided on the pins will depend on the tree grower's preference and the length of the plug required.

It has been found that the V-shaped pockets 16 cause the root to prune off naturally.

While only preferred embodiments of the invention have been described herein in detail, the invention is not limited thereby and modifications can be made within the scope of the attached claims.

What is claimed is:

1. A method of facilitating root branching in a seedling which comprises the step of growing the seedling in a container which has an inner cavity and a circumferentially extending recess on the internal surface of the container between the top and the bottom of the container, said recess having a depth dimension in the vertical direction for trapping the end of a root therein and extending along said internal surface in a horizontal direction essentially encircling the inner cavity, said internal surface being non-perforated in the area adjacent said recess.

2. A method of facilitating root branching in a seedling which comprises the step of growing the seedling in a container which has an inner cavity and a plurality of circumferentially extending recesses on the internal surface of the container between the top and the bottom of the container and spaced along the height thereof, said plurality of recesses having a depth dimension in the vertical direction for trapping the end of a root therein and extending along said internal surface in a horizontal direction essentially encircling the inner cavity, the internal surface being non-perforated in the area adjacent said plurality of recesses.

3. A method of facilitating root branching in a seedling which comprises the step of growing the seedling in a container which has an inner cavity and a circumferentially extending recess on the internal surface of the container between the top and bottom of the container, said recess having a depth dimension in the vertical direction for trapping the end of a root therein and extending along said internal surface in a horizontal direction essentially encircling the inner cavity, said recess having a V-shaped cross section and said internal surface being non-perforated in the area adjacent said recess.

4. A container for a seedling wherein the container defines an inner cavity and is provided with a circumferentially extending recess on the internal surface of the container in between and spaced from the top and the bottom thereof, said recess having a depth dimension in the vertical direction for trapping the end of a root therein and extending along said internal surface in a horizontal direction essentially encircling the inner cavity, said internal surface being non-perforated in the area adjacent said recess.

5. The container according to claim 4, wherein the container has a plurality of said circumferentially extending recesses spaced along the height of the container.

6. The container according to claim 4, wherein the recess has a V-shaped cross section.

7. A seedling container which comprises a body member which is provided with a plurality of longitudinal cavities for seedlings and wherein each cavity is provided with a circumferentially extending recess on the internal surface of the cavity in between and spaced from the top and the bottom thereof, said recess having a depth dimension in the vertical direction for trapping the end of a root therein and extending along said internal surface in a horizontal direction essentially encircling the cavity, said internal surface being non-perforated in the area adjacent said recess.

8. The seedling container according to claim 7, wherein the cavity has a plurality of said circumferentially extending recesses spaced along the length of the cavity.

9. The seedling container according to claim 7, wherein the recess has a V-shaped cross section.

10. The seedling container according to claim 7, wherein the cavity is circular in cross section.

11. The seedling container according to claim 7, wherein the cavity is rectangular in cross section in the area of the recess.

* * * * *